Nov. 20, 1956   G. D. CREELMAN   2,771,000
GREASE SPOT PHOTOMETER
Filed May 19, 1954
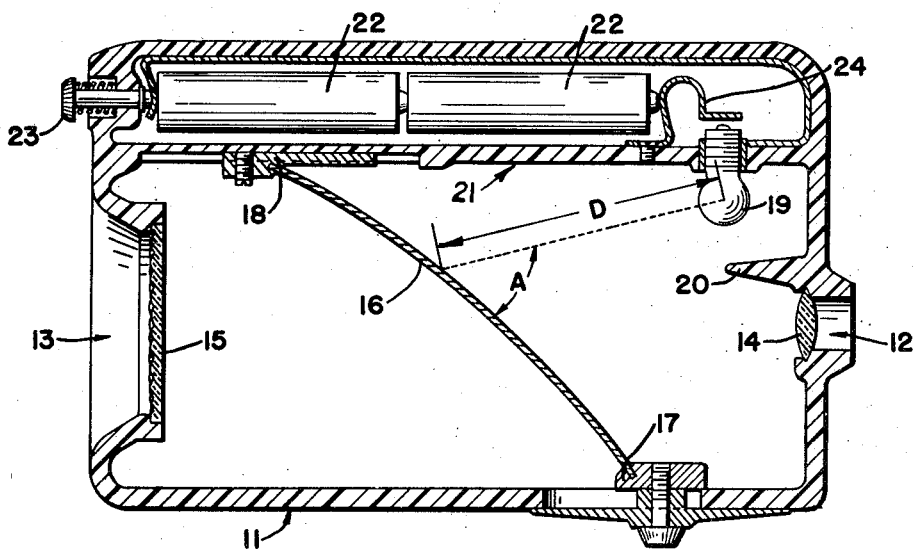
FIG. I
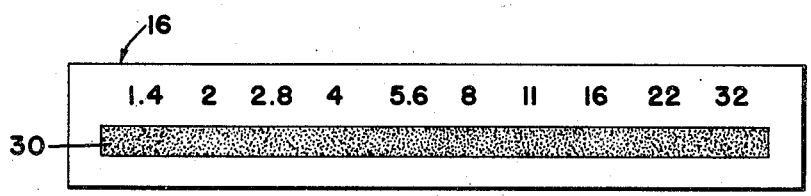
FIG. 2
INVENTOR.
GEORGE D. CREELMAN
BY
Lawrence C. Turnock, Jr.
ATTORNEY

2,771,000

GREASE SPOT PHOTOMETER

George D. Creelman, Cleveland Heights, Ohio

Application May 19, 1954, Serial No. 430,809

3 Claims. (Cl. 88—23)

This invention relates to a photometer and, more particularly, to an improved grease spot photometer which can convert the light intensity from any source to the proper aperture for a camera using film of a given sensitivity.

In photography the amount of light that reaches the light-sensitive film is determined (1) by shutter speed or the time the film is exposed, (2) by the aperture or cross-sectional area of the camera diaphragm, (3) by the type of light-filter, if any, which might be used, and (4) by the intensity of light coming from the subject to be photographed. For practical purposes, the nature of the subject determines shutter speed and the type of light filter to be used. Variations in light intensity are compensated by aperture adjustments and, therefore, the problem of most photographers is to estimate light intensity accurately.

If the amount of light reaching a film is too great, the film is said to be overexposed. Conversely, if too little light reaches the film, it will be underexposed. When using ordinary black and white film, reasonably clear pictures are obtainable when the exposure varies from one-half to double the ideal value. This variation is compensated by the comparatively low sensitivity or wide latitude of the film. Few people are able to estimate exposures within the latitude available for black and white films. Their problem is more acute in color photography because the latitude of such film only permits a variation of 0.75 to 1.5 times the ideal value. Therefore, commercial, as well as amateur, photographers have come to rely on various types of light meters to measure the intensity of light coming from any subject.

There are two common types of light meters, both of which possess disadvantages. Photoelectric meters have been the most reliable. However, they are delicate devices, are generally too insensitive to be used in ordinary artificial light, and are too expensive for the average amateur photographer. The second type is the so-called extinction meter. This type of meter is relatively inexpensive and can be used on subjects that are dimly illuminated. However, its accuracy is very poor as will be apparent from a consideration of its use. The subject to be photographed is viewed through a light filter strip whose opacity is graduated. The point on the strip at which light is just extinct is correlated with the correct camera aperture. This point is determined by the eye. But in view of the well known fact that the human eye adjusts itself to illumination by enlarging or contracting its pupil, the judgment of the eye is unreliable.

An advantage of my invention is that it provides a light meter which is accurate, inexpensive, compact, and independent of the sensitivity of the eye to illumination.

Another advantage is that it is more sensitive in dim light than all but the most expensive photoelectric meters.

A still further advantage is that its preferred embodiment has no moving parts.

My invention makes use of the principle of the comparative or grease spot photometer. For example, a spot of grease or wax on paper will appear dark or light as compared with the adjacent unwaxed paper, depending on whether the intensity of light reflected from the viewed surface adjacent the spot is greater or less than that transmitted through the spot from its reverse side. This spot is quite sensitive to small differences in illumination in that, for example, when disposed between two lights it will change from dark to light as a result of a very small decrease in the illumination on the adjacent viewed surface or a corresponding increase on its other side. The change is independent of the sensitivity of the eye.

The nature and scope of my invention will be better understood from a consideration of the following discussion and accompanying drawings in which:

Figure 1 is a plan view of the preferred embodiment of my photometer, and

Figure 2 shows the details of an indicator strip.

Referring now to Figure 1, my photometer consists of a pocket size container or box 11, preferably painted black on the inside, with an eye opening or window 12 in one end and a view opening or window 13 on the opposite end. A lens 14 and a diffuser plate 15 may be fixed just inside the eye and view openings 12 and 13, respectively.

The use of a lens is preferred, and it should have a magnifying power great enough so that one using my photometer can focus his eye clearly on the grease-spot indicator strip 16 which in most cases will be closer than the normal eye can focus.

The "Fly's Eye" type diffuser, as illustrated, is preferred because it will reflect unusually bright light coming from an angle. Such light would otherwise introduce some error in the result. If a flat or ground glass diffuser is employed it should be recessed deeper into the case 11 away from the opening 13. Ground glass is preferred over opal or milk glass for diffusers.

The grease-spot indicator strip 16 is disposed at an angle to the line of vision between the two openings and is held by suitable clamps 17 and 18. It completely partitions the case 11 between the two openings. A light bulb 19 is affixed to the divider 21 at the end of the case 11 in which is located the eye opening 12. Direct illumination of the opening 12 by the bulb 19 is prevented by the baffle 20. A divider 21 provides space in the case 11 for the dry cell batteries 22, preferably of the mercury type used in hearing aids because of their longer life. The bulb 19 is lighted by pressing the spring loaded switch 23. The batteries are thereby forced against the contact element 24 which in turn completes an electrical circuit by touching the bulb 19.

The details of the grease-spot indicator strip 16 are shown in Figure 2. The strip should contain two sections whose relative brightness will be compared. One section, such as shown in the shaded portion 30, must be translucent. If the other section is also translucent, it must be of a different degree; otherwise, no comparison could be made.

A typical embodiment would be a strip of white bond paper saturated with a low melting point paraffin wax, grease, or some other light and relatively clear hydrocarbons. Ordinary cigarette lighter fluid (petroleum naphtha) may be used although it is not recommended. This saturant may be applied to the strip as shown in the shaded or translucent portion 30. Another embodiment of the indicator strip might consist of a strip of polyethylene whose shaded portion 30 is translucent and the balance opaque.

The shaded portion 30 is divided into a plurality of sections which are numbered from one end to the other. The numbers, which are placed above the shaded sections, correspond to aperture settings normally found in present-day cameras.

The actual correlation between these numbers and the correct aperture for any particular film may be placed in a table to be provided with the photometer. A number range from one to ten, for example, would correspond to aperture settings of 1.4, 2, 2.8, 4, 5.6, 8, 11.3, 16, 22.6, and 32 for a film having an exposure rating or A. S. E. Index of 50. If the exposure times of all films were the same, the table would not be necessary and the actual aperture setting numbers could be placed on the strip as shown in Figure 2.

In place of the table it would be possible to provide a plurality of indicator strips with each case and the viewer would select and use the one which corresponds to the exposure time of the film he proposes to use in his camera.

In operation the viewer would place his eye at the opening 12 and point the case 11 toward the subject to be photographed. The bulb 19 should then be lighted by pressing the switch 23. He can then determine the point on the indicator strip 16 where the saturated portion appears to be as bright as the adjacent unsaturated portion. The number above this point is the correct aperture setting.

The use of the diffuser 15 is preferred because it averages the illumination received. This averaged illumination then passes to the indicator strip 16. If the diffuser were omitted and the subject to be photographed contained a small but intense light, the observed aperture setting would not be as accurate as the use of some films might require.

While not required, the presence of the lens 14 is preferred. It permits the use of a smaller opening 12 and enables one to make more accurate readings because the indicator strip will be in clear focus.

The range of my photometer is in large part dependent on the position of the indicator strip 16 inside the case 11. As mentioned before, this comparative type photometer uses a flash light bulb powered by small dry cell batteries as a light source. The intensity of light or illumination from this source on the indicator strip must vary along the strip so that it may be compared with the amount of light falling on the other side. This variation in illumination is produced by placing the strip at an angle with the line of sight as shown in Fig. 1. The light falling on the strip from the bulb varies directly with the sine of the angle of incidence A and inversely with the square of the distance D of the strip from the bulb. Stated as a formula, the relation is:

$$\text{Illumination } (I) = K \frac{\sin A}{D^2}$$

K is a constant. At clamp 17 it will be evident that I is at a maximum because D is at a minimum and sin A is at a maximum. If in operation the indicator changes from dark to light in the region near clamp 17, the illumination from the subject to be photographed will be very large. The corresponding aperture will be quite small.

At some point on the strip remote from clamp 17, angle A will be much smaller and D correspondingly greater. Obviously, therefore, illumination will be quite small, comparatively, and the aperture large.

The scale of the indicator strip may be increased by curving it away from the bulb 19 and particularly curving that portion of the strip near the clamp 18. In effect this curvature would lower the angle A thereby diminishing the illumination in that region. The useful range of my photometer may also be extended by placing a light filter in front of the bulb 19.

In the final stages of manufacturing the embodiment shown in Figure 1, it may be necessary to adjust the position of the indicator along the line of vision to account for normal variations in light bulb and/or battery outputs.

From the foregoing discussion it will be seen that the comparison of illumination from the standard bulb and from the subject to be photographed is accomplished in the embodiment shown in Figure 1 by varying their relative distance from the indicator strip. By appropriate modifications the same result can be attained by two other methods.

The first alternative embodiment may be constructed by replacing the diffuser with a light valve in the form of a graduated filter or optical wedge by means of which the intensity of light transmitted to the indicator strip 16 (placed perpendicular to the line of vision) is varied to match the light from the bulb 19. A graduated filter strip, for example, may be drawn across the opening 13 by winding it up on a small drum. The position of the drum would be correlated with aperture settings.

In the second alternative embodiment the intensity of the light from the bulb which reaches the indicator strip (again placed perpendicular to the line of vision) would be varied by incorporating a variable rheostat in the electrical circuit. Aperture settings would correspond to the rheostat position.

The embodiment shown in Figure 1 is preferred over the two alternates described because it contains no moving parts.

For accurate results, particularly when using color film, it may be necessary from time to time to obtain an absolute calibration of my photometer by taking a reading at a measured distance from a standard incandescent bulb, or by comparing its results with a sensitive photoelectric meter, and applying appropriate corrective factors to the indicator strip settings.

Any errors which develop will be caused primarily by the slow deterioration of the dry cell batteries. When their useful life is about gone, their voltage begins to drop at an increasing rate. This voltage drop affects the amount of light emitted by the bulb. Since this light is proportional to the square of the voltage, a voltage drop from $\sqrt{2}$ to 1, for example, will result in a drop in the amount of light from 2 to 1. A 50% drop in the amount of light would require a doubling of the aperture. The latitude of ordinary black and white film, as mentioned above, would not permit errors greater than this.

I have described only a few of the many embodiments of my invention which will occur to those skilled in the art.

I claim:

1. A portable photometer comprising a box with a window in the first of two opposite sides for admitting the light to be measured, an aperture in the second opposite side for observing the admitted light, a light source near one corner of the box adjacent the aperture, a light shield between the light source and the aperture, and a vertical partition in the box between the window and aperture comprising an indicator strip positioned opposite said corner and at an acute angle with the line of sight between the window and aperture.

2. The device of claim 1 which contains a diffuser plate over the second window.

3. The device of claim 2 in which the light is powered by means of at least one dry cell battery.

References Cited in the file of this patent

UNITED STATES PATENTS

| 464,059 | Barker | Dec. 1, 1891 |
| 1,297,260 | Sharp | Mar. 11, 1919 |
| 2,246,817 | Sauer | June 24, 1941 |

FOREIGN PATENTS

| 196,405 | Germany | Mar. 14, 1908 |
| 264,039 | Great Britain | Jan. 13, 1927 |